United States Patent
Miyake

(10) Patent No.: US 10,503,092 B2
(45) Date of Patent: Dec. 10, 2019

(54) IMAGE FORMING APPARATUS THAT PERFORMS EXPOSURE FOR DISCHARGING PHOTOCONDUCTIVE DRUM

(71) Applicant: CANON KABUSHIKI KAISHA, Tokyo (JP)

(72) Inventor: Kazunori Miyake, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/115,319

(22) Filed: Aug. 28, 2018

(65) Prior Publication Data

US 2019/0072871 A1    Mar. 7, 2019

(30) Foreign Application Priority Data

Sep. 4, 2017    (JP) .................. 2017-169296

(51) Int. Cl.
| | |
|---|---|
| *G03G 15/043* | (2006.01) |
| *G02B 26/12* | (2006.01) |
| *G03G 15/04* | (2006.01) |
| *G02B 27/30* | (2006.01) |
| *G02B 27/09* | (2006.01) |

(52) U.S. Cl.
CPC ......... *G03G 15/043* (2013.01); *G02B 26/121* (2013.01); *G02B 27/0955* (2013.01); *G02B 27/30* (2013.01); *G03G 15/04054* (2013.01); *G03G 15/04072* (2013.01); *G03G 15/04081* (2013.01)

(58) Field of Classification Search
CPC .. G02B 26/121; G02B 27/0955; G02B 27/30; G03G 15/043; G03G 15/04054; G03G 15/04072; G03G 15/04081
See application file for complete search history.

(56) References Cited

U.S. PATENT DOCUMENTS

| | | | | |
|---|---|---|---|---|
| 5,663,814 A | * | 9/1997 | Hada .................. | H04N 1/40037 358/475 |
| 5,729,626 A | * | 3/1998 | Hada .................. | H04N 1/40037 358/300 |
| 7,920,155 B2 | * | 4/2011 | Miyake .................... | B41J 2/471 347/234 |
| 2011/0164891 A1 | * | 7/2011 | Miyake .................... | B41J 2/471 399/51 |
| 2012/0236373 A1 | * | 9/2012 | Oyama .............. | H04N 1/40056 358/475 |
| 2015/0054902 A1 | * | 2/2015 | Maeda ................. | G03G 15/043 347/132 |
| 2017/0090190 A1 | * | 3/2017 | Chen .................... | G02B 26/124 |

FOREIGN PATENT DOCUMENTS

JP    2017026963 A    2/2017

* cited by examiner

*Primary Examiner* — Rodney A Bonnette
(74) *Attorney, Agent, or Firm* — Canon U.S.A., Inc. IP Division

(57) ABSTRACT

In an image forming apparatus that executes exposure for discharging a photoconductive drum by a light emitting unit by which an electrostatic latent image is formed, a duty ratio of a drive signal for a driving unit that exposes the photoconductive drum for performing discharging of the photoconductive drum is set to be 100%, and it is thereby possible to suppress generation of radiation noise resulting from the drive signal for the discharging.

12 Claims, 10 Drawing Sheets

FIG. 7

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| 0000 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0001 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 |
| 0010 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 |
| 0011 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 |
| 0100 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 |
| 1010 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 |
| 0110 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 |
| 0111 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 |
| 1000 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 |
| 1001 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 |
| 1010 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 |
| 1011 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 |
| 1100 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 |
| 1101 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 |
| 1110 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 |
| 1111 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 |

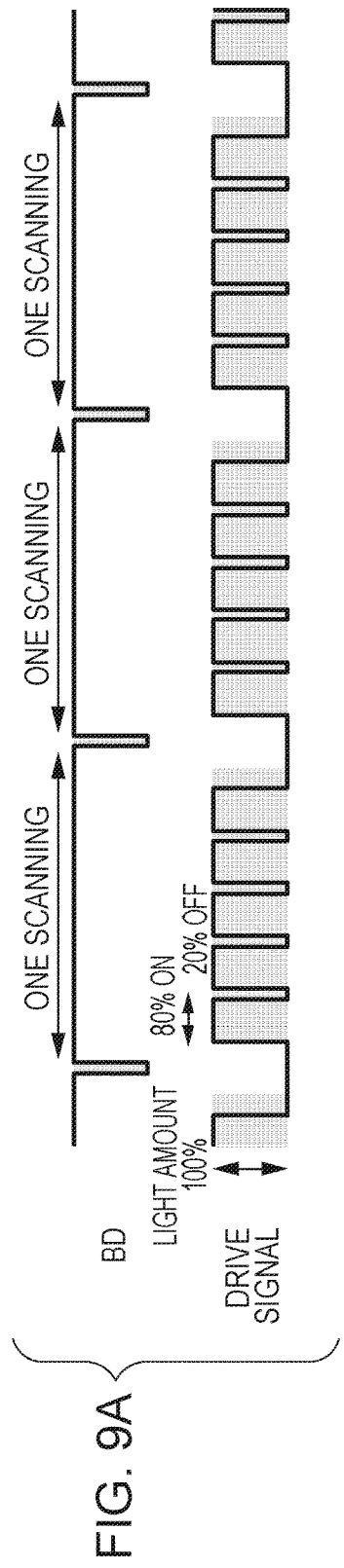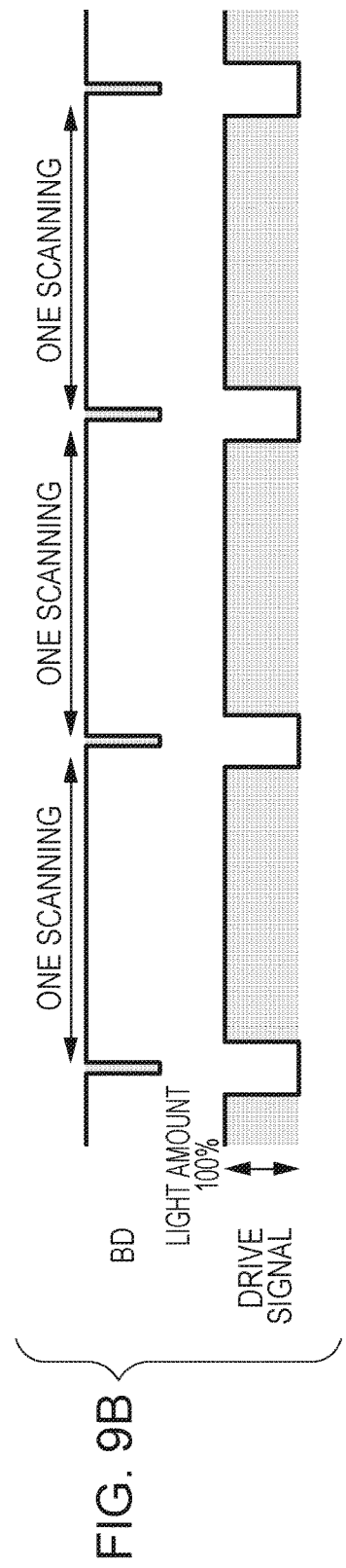

IMAGE FORMING APPARATUS THAT PERFORMS EXPOSURE FOR DISCHARGING PHOTOCONDUCTIVE DRUM

BACKGROUND OF THE INVENTION

Field of the Invention

The disclosure relates to an image forming apparatus that performs exposure for discharging a photoconductive drum.

Description of the Related Art

An image forming apparatus that exposes a plurality of photoconductors to thereby form electrostatic latent images on the photoconductors, develops the electrostatic latent images with use of different toner, and transfers the developed toner images onto a recording medium to thereby form a color image has been known.

As the aforementioned image forming apparatus, an image forming apparatus that performs control (hereinafter, discharging control) that residual electric charge generated in a charge generation layer of a photoconductor in the last image formation process (charging and exposure) is removed by exposing the photoconductor with relatively high intensity has been proposed (for example, Japanese Patent Laid-Open No. 2017-26963). When such discharging control is performed, a charge carrier is generated all over the charge generation layer of the photoconductor and the residual electric charge that has remained in the charge generation layer is discharged. When the residual electric charge is discharged, unevenness of potential of the photoconductor due to the residual electric charge is solved.

The image forming apparatus described in Japanese Patent Laid-Open No. 2017-26963 is an apparatus that includes an exposure device different from an exposure device (for example, an optical scanning device or an LED print head) emitting light by which an electrostatic latent image is formed and that performs discharging control of exposing the photoconductor by the exposure device. As the image forming apparatus described in Japanese Patent Laid-Open No. 2017-26963, an image forming apparatus that performs, at a timing different from that of exposure for forming an electrostatic latent image by an optical scanning device or an LED print head, discharging control of exposing a photoconductor has been put to practical use.

However, a problem described as below may be caused in the discharging control. There is an apparatus that forms an image by repeating turning on and off a light source of exposure for each pixel even in a case where a solid image is formed. At this time, in order to turn on/off the light source of exposure, a drive signal having a high-speed frequency of about 60 MHz is generated per pixel, so that radiation noise resulting from a high frequency component of the drive signal is caused. Since radiation noise intensity of the radiation noise increases in proportion to the number of times of turning on/off of the drive signal, the intensity of the radiation noise increases when a solid image for which the number of turning on/off is large is formed. In particular, an image forming apparatus that is provided with a different light source of exposure for each color includes a plurality of generation sources of the radiation noise, so that radiation noise intensity of which is high is generated when the discharging control is performed at the same time.

FIG. 10 illustrates an example of a countermeasure against radiation noise. A drive signal is generated by an ASIC mounted on a board 1001. The drive signal is transmitted by a differential signal from the board 1001 to a board 1003 through a cable such as a flexible flat cable 1005. As a countermeasure against the radiation noise caused by the drive signal, adding a noise filter such as a capacitor C1, C2, or C3, a ferrite bead FB1 or FB2, or a common mode choke coil NF to a laser diode drive circuit or adding a ferrite core 1006 to the cable is considered as illustrated in FIG. 10. However, the countermeasure against the noise, in which the noise filter or the ferrite core is used, causes an increase in costs of the image forming apparatus.

SUMMARY OF THE INVENTION

The disclosure of the subject application provides an image forming apparatus that includes a plurality of photoconductive drums; a plurality of light emitting units each of which emits light with which a corresponding one of the photoconductive drums is exposed in a case where a driving current is supplied, the light emitting units being separately provided correspondingly to the plurality of photoconductive drums; a driving unit that supplies the driving current to each of the light emitting units in accordance with a drive signal, the drive signal being an ON/OFF signal by which the light emitting unit is turned on or off; and a controller that transmits the drive signal to the driving unit, the controller selectively transmitting the drive signal generated on a basis of input image data for forming an electrostatic latent image on each of the photoconductive drums or the drive signal a duty ratio of which is 100% for performing discharging of the photoconductive drum.

Further features and aspects of the disclosure will become apparent from the following description of numerous example embodiments with reference to the attached drawings.

BRIEF DESCRIPTION OF THE DRAWINGS

FIG. 7 is a conversion table used for converting image data into a bit pattern corresponding to a drive signal.

FIGS. 9A and 9B are views for explaining a drive signal that is output by the video control unit.

DESCRIPTION OF THE EMBODIMENTS

Hereinafter, a best mode in which the disclosure is carried out will be described with reference to drawings.

Example Embodiment 1

[Image Forming Apparatus]

Figure 1:
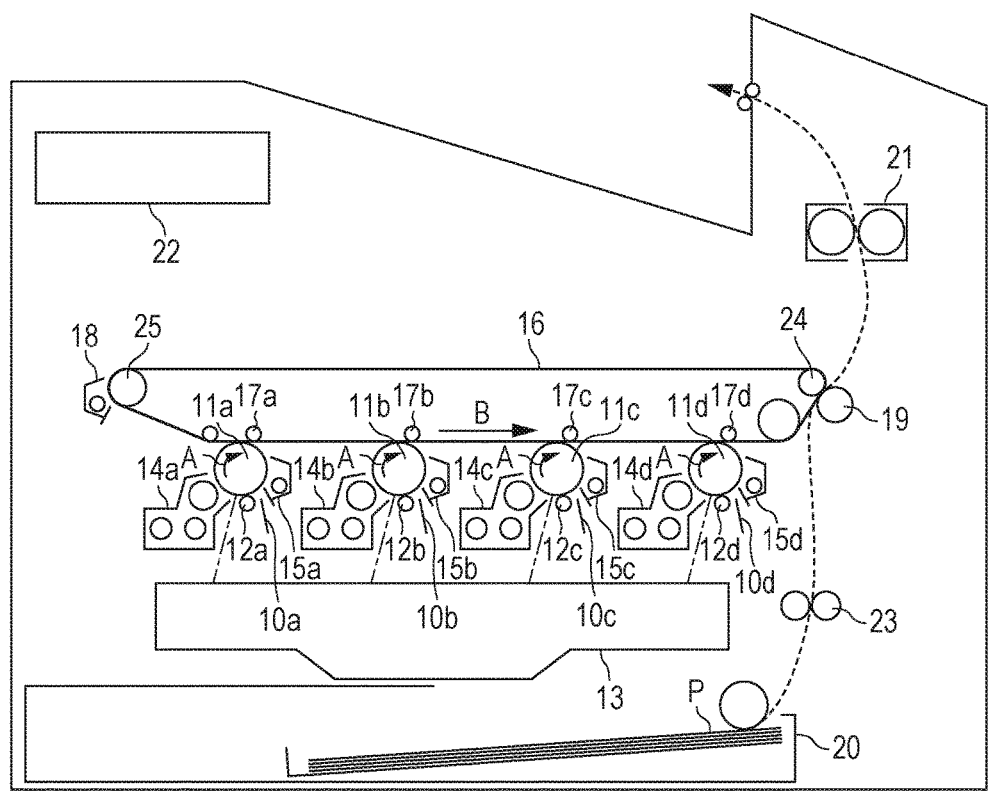
FIG. 1 is a schematic cross sectional view of an image forming apparatus according to an example embodiment 1.

FIG. 1 is a schematic cross sectional view of an image forming apparatus according to the present example embodiment. The image forming apparatus illustrated in FIG. 1 is a printer which is not provided with a reading device that reads an original document, but the embodiment may be a copier that is provided with the reading device or a multifunctional peripheral equipment that includes a facsimile function.

The image forming apparatus includes photoconductive drums 11a to 11d serving as photoconductors, charging devices 12a to 12d, an exposure device (exposure unit) 13, developing devices (developing units) 14a to 14d, and cleaning devices (cleaners) 15a to 15d. Moreover, the image forming apparatus includes primary transfer rollers (primary transfer units) 17a to 17d serving as primary transfer devices, an intermediate transfer belt 16 serving as an intermediate transfer member, an intermediate transfer belt cleaner 18, a secondary transfer roller 19, and a fixing device (fixing unit) 21. Furthermore, the image forming apparatus includes a sheet feeding cassette 20.

In the image forming apparatus of the present example embodiment, the photoconductive drums 11a to 11d of yellow (11a), magenta (11b), cyan (11c), and black (11d) are arrayed in a line along a rotational direction of the intermediate transfer belt 16 that is stretched between a driven roller 24 and a driving roller 25. Moreover, in the image forming apparatus of the present example embodiment, the primary transfer rollers 17a to 17d of yellow (17a), magenta (17b), cyan (17c), and black (17d) are arrayed at positions respectively facing the photoconductive drums 11a to 11d via the intermediate transfer belt 16.

Next, an image formation process executed by the image forming apparatus will be described. The photoconductive drums 11a to 11d of the respective colors are uniformly charged by the primary charging units 12a to 12d, respectively, and thereafter exposed by the exposure unit 13 on the basis of input image data. Electrostatic latent images are formed on the photoconductive drums 11a to 11d by the exposure. The electrostatic latent images formed on the photoconductive drums 11a to 11d are developed by the developing units 14a to 14d that respectively correspond to the photoconductive drums 11a to 11d. The toner images developed on the photoconductive drums 11a to 11d are respectively transferred onto the intermediate transfer belt 16 by the primary transfer units 17a to 17d.

The toner images transferred onto the intermediate transfer belt 16 are transferred by the secondary transfer roller 19 onto a recording material P that has been conveyed from the sheet feeding cassette 20 by a conveyance roller 23. Residual toner that has remained on the photoconductive drums 11a to 11d is collected by the cleaners 15a to 15d, and residual toner that has remained on the intermediate transfer belt 16 is collected by the intermediate transfer belt cleaner 18. The toner images transferred onto the recording material P are fixed by the fixing unit 21.

The image formation process includes a discharging process. The discharging process is exposure control for discharging and removing charge that has remained in a photoconductive layer of a photoconductive drum due to charging in the image formation process or formation of an electrostatic latent image. When discharging control is performed, a charge carrier is generated all over a charge generation layer of the photoconductor and residual electric charge that has remained in the charge generation layer is discharged. When the residual electric charge is discharged, unevenness of potential of the photoconductor is solved. In the discharging process, the exposure unit 13 uniformly exposes the photoconductive drums 11a to 11d of the respective colors with predetermined exposure intensity.

In the image forming apparatus of the present example embodiment, the discharging process of one of the photoconductive drums 11a to 11d is performed after forming an electrostatic latent image for forming a toner image to be transferred onto one sheet of a recording material and before starting formation of an electrostatic latent image for forming a toner image to be transferred onto a next recording material. That is, in the image forming apparatus of the present example embodiment, exposure for each of the photoconductive drums 11a to 11d for discharging is executed every formation of an electrostatic latent image on one sheet of a recording material. Note that, the discharging may be executed every formation of an electrostatic latent image on the predetermined number of sheets (plurality of sheets) of recording materials.

Next, the exposure unit 13 will be described. The exposure unit 13 in the present example embodiment is an optical scanning device that emits laser light for exposing the plurality of photoconductive drums 11a to 11d. Although the image forming apparatus that is provided with one exposure unit 13 for the plurality of photoconductive drums 11a to 11d will be exemplified in the present example embodiment, the embodiment is not limited thereto. The embodiment may be an image forming apparatus that is provided with a plurality of optical scanning devices which correspond to a plurality of photoconductive drums.

Figure 2:
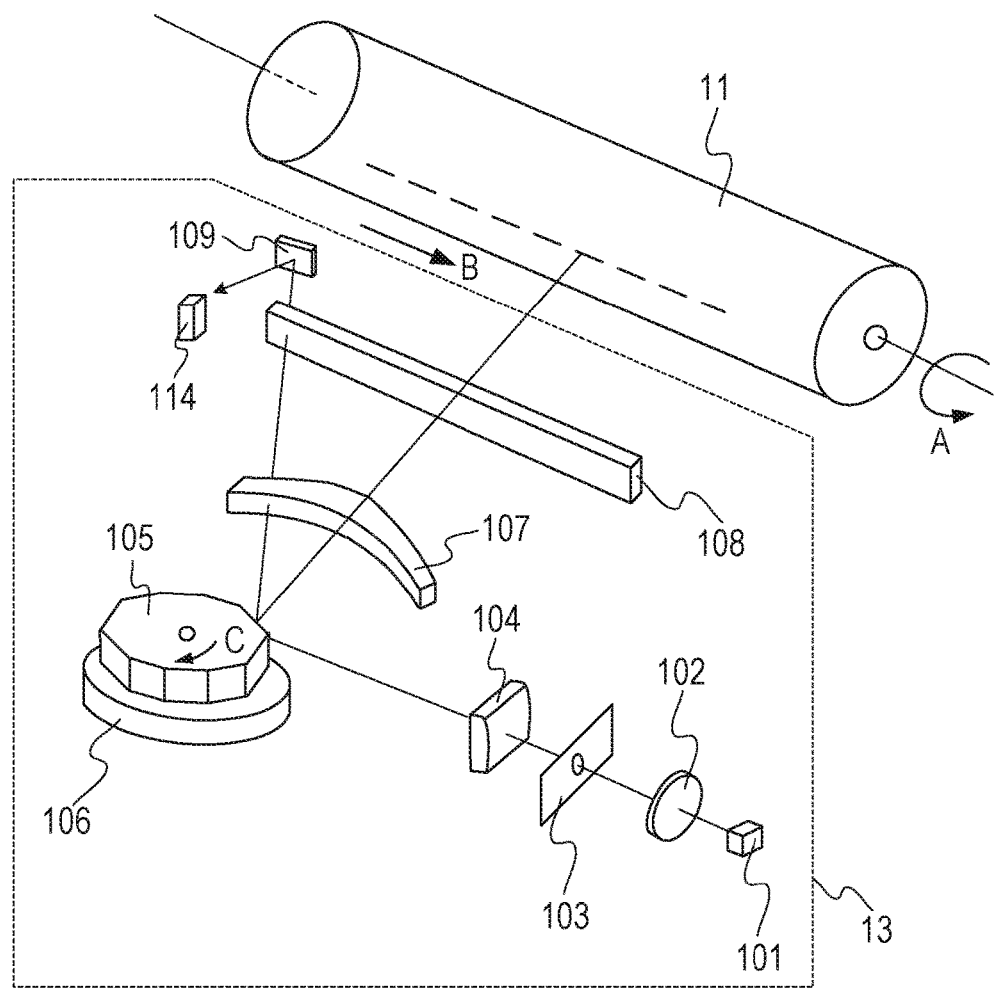
FIG. 2 is a schematic configuration view of an exposure unit 13.

FIG. 2 is a schematic configuration view of the exposure unit 13. For simplification of description, a configuration for forming an electrostatic latent image on one photoconductive drum (for example, the photoconductive drum 11a) will be exemplified.

The exposure unit 13 is provided with a semiconductor laser 101 serving as a laser light source, a collimator lens 102, an aperture diaphragm 103, a cylindrical lens 104, a polygon mirror 105, a polygon motor 106, a toric lens (fθ lens) 107, and a diffraction optical element 108. Furthermore, the exposure unit 13 is provided with a reflection mirror 109 and a BD sensor 114.

The semiconductor laser 101 turns on in accordance with a drive signal. As described below, the drive signal (PWM signal) is a binary signal (ON/OFF signal) and includes a pulse by which laser light is emitted from the semiconductor laser 101. The collimator lens 102 converts the laser light emitted from the semiconductor laser 101 into a parallel light flux. The aperture diaphragm 103 is provided in order to adjust a spot shape of the laser light which has been converted into the parallel light flux. The laser light that has passed through the aperture diaphragm 103 comes incident on the cylindrical lens 104. The cylindrical lens 104 is a lens that has refracting power of the laser light only into a rotational axis direction of the rotating polygon mirror 105 (polygon mirror) that will be described below. The laser light that has passed through the cylindrical lens 104 comes incident on a plurality of reflection surfaces of the rotating polygon mirror 105. The rotating polygon mirror 105 receives driving force from the polygon motor 106 and rotates around a rotational axis. The rotating polygon mirror 105 deflects incoming laser light so that the laser light scans the photoconductive drum 11. The laser light deflected by the rotating polygon mirror 105 is led onto the photoconductive drum 11 by optical members such as the fθ lens 107 and the diffraction optical element 108. The laser light scans, in a direction of an arrow B, the photoconductive drum 11 that rotates in a direction of an arrow A.

The exposure unit 13 further includes the reflection mirror 109 and the beam detector 114 (hereinafter, BD 114). In a scanning direction (main scanning direction) in which the laser light scans a surface of the photoconductive drum 11, the reflection mirror 109 is at a position which is out of a scanning region where scanning is performed on the surface of the photoconductive drum 11, and arranged within a scanning range of the laser light. The reflection mirror 109 is scanned with the laser light deflected by the rotating polygon mirror 105. The reflection mirror 109 reflects the incident laser light. The laser light reflected by the reflection mirror 109 scans a light receiving surface of the BD 114. The light receiving surface of the BD 114 is a photoelectric conversion element and, when receiving laser light, outputs a BD signal that indicates the light reception. The BD signal is a main scanning synchronization signal for making writing start positions of an image uniform in each scanning cycle, that is, for synchronizing writing start timings of an image in the main scanning direction. One scanning cycle of the laser light is a period from generation of a BD signal until generation of the next BD signal. In one scanning cycle of the laser light, a drive signal corresponding to a first pixel in the main scanning direction is output when predetermined time has passed after generation of a BD signal, so that it is possible to make writing start positions of an image coincide with each other in each scanning cycle.

Figure 3:
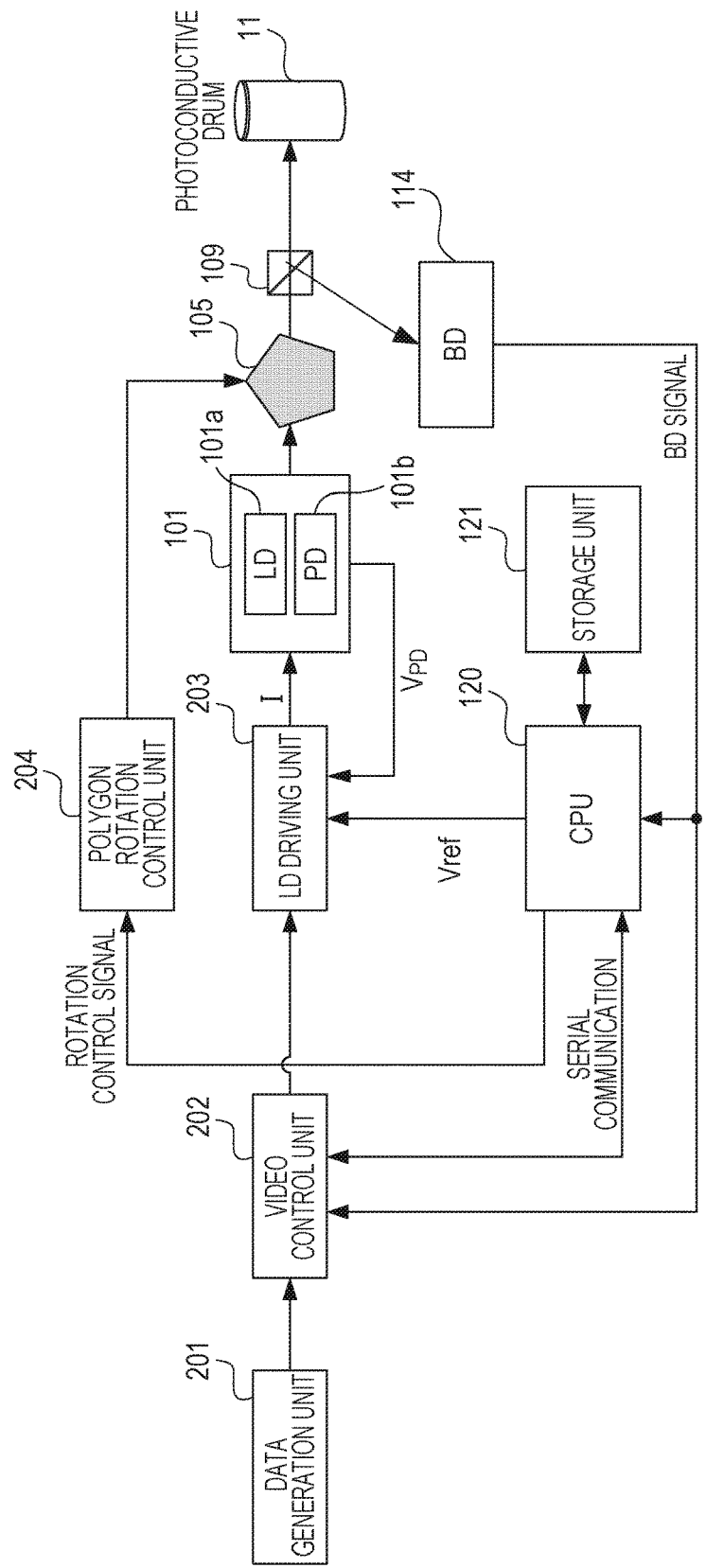
FIG. 3 is a control block diagram of the image forming apparatus.

FIG. 3 is a control block diagram of the image forming apparatus illustrated in FIG. 1. The image forming apparatus of the present example embodiment is provided with a data generation unit 201, a video control unit 202, an LD driving unit 203, and a polygon rotation control unit 204. Moreover, the image forming apparatus of the present example embodiment includes the semiconductor laser 101 serving as a laser light source, a CPU 120, and a storage unit 121.

The data generation unit 201 generates image data from image data input from an external information terminal such as a personal computer or a tablet or image data of an original image read by a reading device. The data generation unit 201 transmits the generated image data to the video control unit 202.

The video control unit 202 serving as a data processing unit generates a drive signal by performing data processing which will be described below. The video control unit 202 transmits the generated drive signal to the LD driving unit 203. The video control unit 202 may be provided as a module different from the data generation unit 201 in the same IC or may be provided in an IC different from that of the data generation unit 201.

The LD driving unit 203 is a laser driver IC that supplies a driving current I to a laser diode 101a (LD 101a) serving as a light emitting unit embedded in the semiconductor laser 101. The LD driving unit 203 supplies the current I to the LD 101a in accordance with the drive signal. When the current I is supplied, the LD 101a emits laser light. Note that, the laser driver IC is separately provided with respect to each of a plurality of LDs, but a configuration may be such that one laser driver IC drives the plurality of LDs.

In the semiconductor laser 101, a photodiode 101b (PD 101b) is embedded. The PD 101b is a light receiving sensor by which a light amount of the laser light is detected. The LD driving unit 203 includes a setting unit by which a value of the driving current I is set. The LD driving unit 203 supplies the driving current I having a value according to the setting of the setting unit. For example, the setting unit is a capacitor or a digital-to-analog conversion circuit (DAC).

The LD driving unit 203 whose setting unit is a capacitor supplies the driving current I having a value according to a voltage of the capacitor to the LD 101a. The LD driving unit 203 whose setting unit is a DAC supplies the driving current I having a value according to a voltage based on setting (digital value) of the DAC to the LD 101a.

The LD driving unit 203 supplies the driving current I having a value based on the aforementioned setting of the setting unit in a period in which laser light forming an image scans a non-image scanning region during one scanning cycle. The PD 101b receives the laser light emitted from the LD 101a and outputs a light receiving voltage $V_{PD}$ (result of light reception) according to a light amount of the received laser light to the LD driving unit 203.

The storage unit 121 stores control data of various control parameters, a control program, and the like. The CPU 120 controls the image forming apparatus on the basis of the control data.

The CPU 120 outputs a reference voltage Vref to the LD driving unit 203. The reference voltage Vref indicates a voltage value with respect to a target amount of light incident on the PD 101b. The LD driving unit 203 includes therein a comparison circuit that compares the light receiving voltage VPD and the reference voltage Vref, and controls the value of the driving current I in accordance with a comparison result of the comparison circuit. For example, in a case where the comparison result is the reference voltage Vref>the light receiving voltage VPD, the LD driving unit 203 changes setting of the setting unit so that the comparison result becomes the light receiving voltage VPD=the reference voltage Vref. That is, the LD driving unit 203 changes the setting of the setting unit so that the value of the driving current I increases. On the other hand, in a case where the comparison result is the reference voltage Vref<the light receiving voltage VPD, the LD driving unit 203 changes the setting of the setting unit so that the comparison result becomes the light receiving voltage VPD=the reference voltage Vref. That is, the LD driving unit 203 changes the setting of the setting unit so that the value of the driving current I decreases. In a case where the comparison result is the reference voltage Vref=the light receiving voltage VPD, the LD driving unit 203 keeps the setting of the setting unit. By performing feedback control (Automatic Power Control: APC) using the LD driving unit 203 and the PD 101b, the value of the driving current I supplied to the LD 101a is controlled to be a current value corresponding to the target amount of light.

Figure 4:
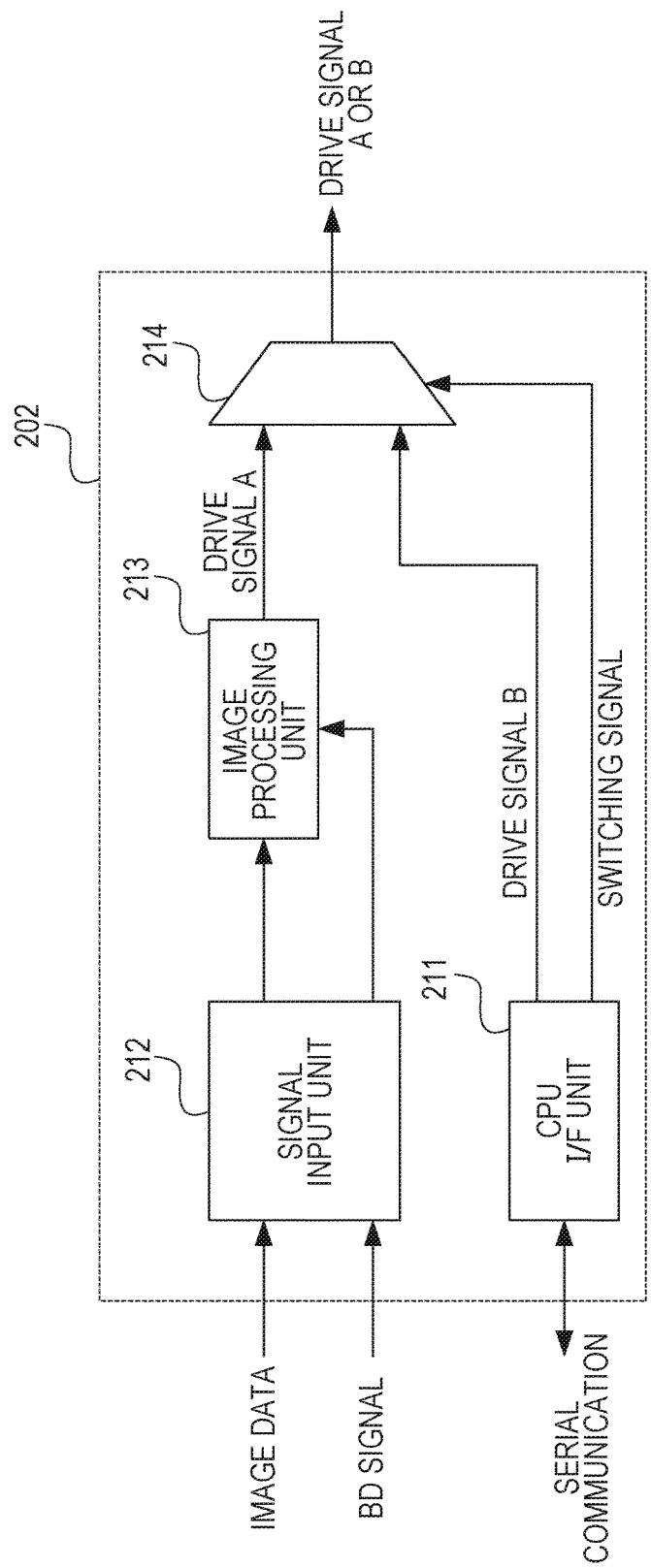
FIG. 4 is a block diagram illustrating an inner configuration of a video control unit.

Next, the video control unit 202 will be described in detail. FIG. 4 is a block diagram illustrating an inner configuration of the video control unit 202.

The video control unit 202 is provided with a CPU I/F unit 211, a signal input unit 212, an image processing unit 213, and a selector 214. The video control unit 202 is connected to the CPU 120 by serial communication. The video control unit 202 operates on the basis of a control signal that is received from the CPU 120 by the serial communication.

To the signal input unit 212, image data is input from the image generation unit 201. Moreover, a BD signal is input to the signal input unit 212 from the BD 114. The signal input unit 212 transfers the image data to the image processing unit 213 at a timing based on the BD signal and a predetermined clock signal (not illustrated).

The image processing unit 213 performs predetermined data processing that will be described below for the image data input from the signal input unit 212. Then, the image processing unit 213 performs an output operation that the image data subjected to the data processing is output in synchronization with the clock signal. The output operation causes a drive signal A to be output from the image processing unit 213.

The CPU 120 outputs a drive signal B described below and a switching signal to the selector 214 via the CPU I/F unit 211. The switching signal is a signal for setting which of the signal from the image processing unit 213 and the signal from the CPU I/F unit 211 is to be output. For example, the switching signal is a signal of one bit of High/Low. In a case where a switching signal High is input, the selector 214 outputs, to the LD driving unit 203, the signal from the image processing unit 213. On the other hand, in a case where a switching signal Low is input, the selector 214 outputs, to the LD driving unit 203, the signal from the CPU I/F 211.

Figure 5:
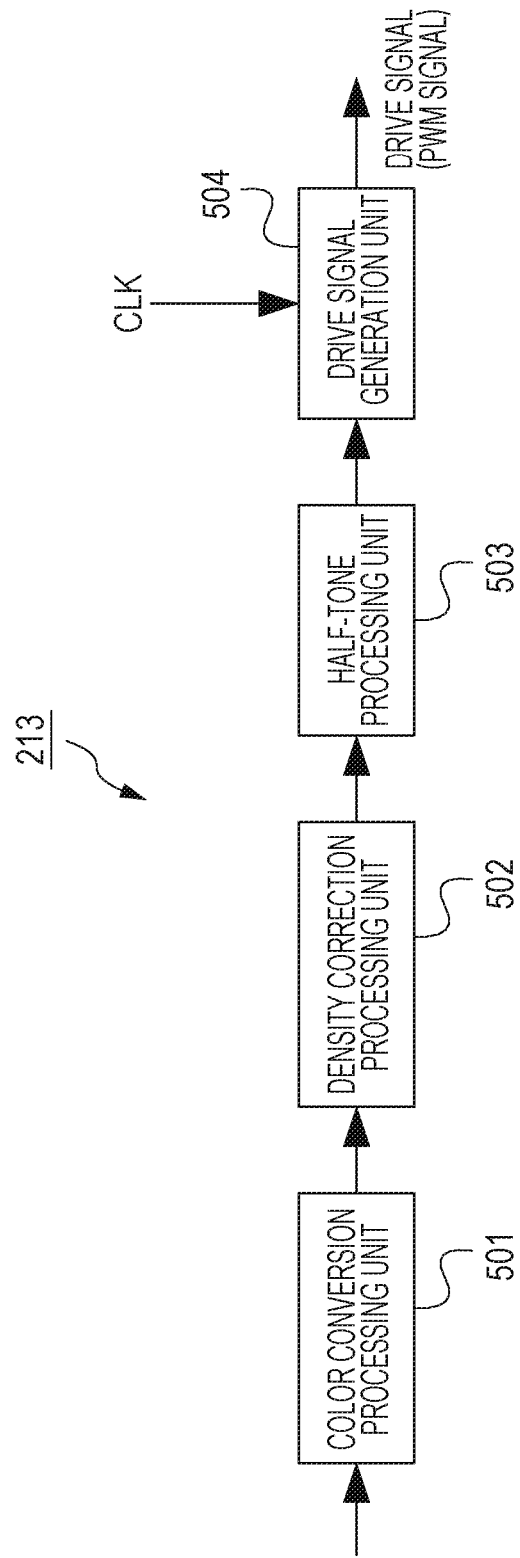
FIG. 5 is a block diagram illustrating an inner configuration of an image processing unit.

Next, the image processing unit 213 will be described in detail. FIG. 5 is a block diagram illustrating an inner configuration of the image processing unit 213. The image processing unit 213 is provided with a color conversion processing unit 501, a density correction processing unit 502, a half-tone processing unit 503, and a drive signal generation unit (signal generation unit) 504. Note that, the density correction processing unit 502, the half-tone processing unit 503, and the drive signal generation unit 504 are to be provided so as to correspond to each of the colors.

The color conversion processing unit 501 performs color conversion processing that image data is converted into image data corresponding to toner of four colors of yellow (Y), magenta (M), cyan (C), and black (K) for forming a color image. The color conversion processing unit 501 generates image data of each of the colors so as to restrict an amount of toner load in accordance with a restriction of fixing performance of the fixing device 21. The color conversion processing unit 501 of the present example embodiment does not perform processing of generating image data which causes toner images of all of the colors to be formed as solid images on one sheet of a recording material.

The density correction processing unit 502 performs density correction processing for the image data of each of the colors, which has been subjected to the color conversion processing. The density correction processing includes gamma correction with which a density characteristic resulting from an engine characteristic of the image forming apparatus are corrected. The density correction processing unit 502 in the present example embodiment performs gamma correction to thereby generate image data corresponding to a region of 4×4 pixels.

Figure 6:
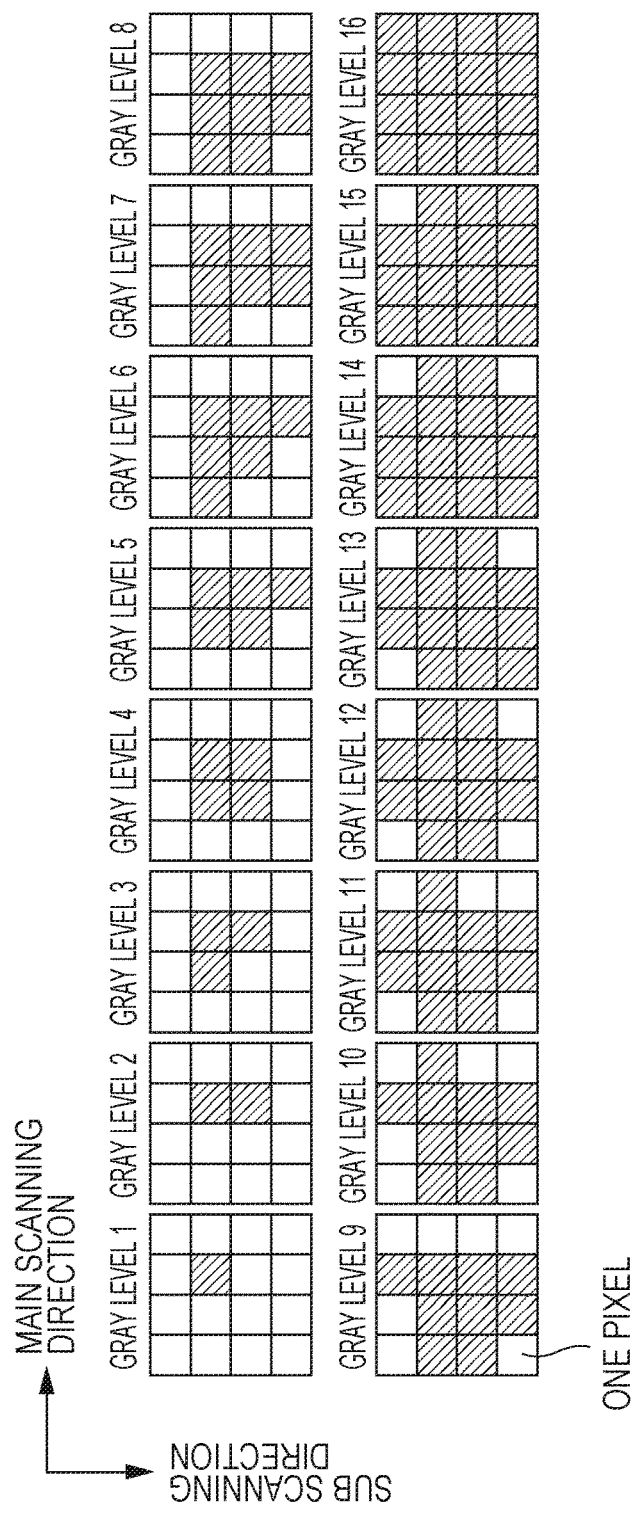
FIG. 6 is a view for explaining half-tone processing (dither processing).

The half-tone processing unit 503 performs half-tone processing, such as error diffusion processing or dither processing, for the image data subjected to the density correction processing by the density correction processing unit 502. FIG. 6 is a view for explaining the half-tone processing (dither processing) performed by the half-tone processing unit 503. In FIG. 6, a horizontal axis corresponds to a scanning direction of laser light, and a vertical axis corresponds to a rotational direction (sub scanning direction) of the photoconductive drum 11. As illustrated in FIG. 6, the half-tone processing unit 503 generates pixel data of each pixel included in the region of 4×4 pixels on the basis of a density value indicated by the image data which is input from the density correction processing unit 502. Each piece of the pixel data indicates a binary density value at least. FIG. 6 illustrates that the pixel data is binary, but the pixel data may be multi-valued. In FIG. 7 described below, the pixel data is configured by four bits (16 gray levels). In FIG. 6, each of gray levels 1 to 16 indicates a density value (four bits) in the region of 4×4 pixels, and the gray level 1 indicates that the density value is "0" and density becomes higher as being close to the gray level 16. As the density value becomes larger, the number of pixels each having the density value increases. Note that, any growth method (dither pattern) of a pixel may be set in accordance with, for example, a type of an image to be output. The half-tone processing unit 503 outputs the generated pixel data to the drive signal generation unit 504.

The drive signal generation unit 504 generates a bit pattern including a plurality of pieces of binary bit data from the pixel data input from the half-tone processing unit 503. The signal generation unit 504 of the present example embodiment converts the pixel data of four bits into a bit pattern of 24 bits by using a conversion table illustrated in FIG. 7. Bit data included in the 24 bits includes ON data by which laser light is caused to be emitted from the semiconductor laser 101 and OFF data by which laser light is not caused to be emitted from the semiconductor laser 101. For example, the signal generation unit 504 converts pixel data of "0000" into a bit pattern of "000000000000000000000000". Moreover, the signal generation unit 504 converts pixel data of "1000", which indicates intermediate density, into "000000000000111111111111". Furthermore, the signal generation unit 504 converts pixel data of "1111", which indicates the highest density value, into a bit pattern of "000001111111111111111111". A duty ratio of a bit pattern for the highest density is designed in accordance with a development characteristic of the image forming apparatus. The duty ratio may be variable in accordance with a state of the apparatus. For convenience, the image forming apparatus of the present example embodiment is set as an apparatus that converts pixel data of the highest density, which is generated on the basis of input image data, into a bit pattern the duty ratio of which is not more than 100%.

In the signal generation unit 504, a clock signal of a predetermined frequency is input. For example, in a case where one pixel corresponds to 60 MHz, the clock signal is a signal of a frequency of 1.44 GHz. The signal generation unit 504 executes an output operation that bit data included in a bit pattern is output bit by bit in synchronization with the clock signal. That is, the signal generation unit 504 executes the output operation of outputting one bit in one cycle of the clock signal.

When the signal generation unit 504 executes the aforementioned output operation, a drive signal is output from the signal generation unit 504. In a case where the signal generation unit 504 outputs a bit pattern of "000000000000000000000000", a drive signal the duty ratio (pulse width) of which is 0% is output from the signal generation unit 504. Therefore, a pixel corresponding to this bit pattern is not developed as a toner image. In a case where the signal generation unit 504 outputs a bit pattern of "000001111111111111111111", a drive signal the duty ratio of which is about 80% is output from the signal generation unit 504. In a case where the signal generation unit 504 outputs a bit pattern of "000000000000111111111111", a drive signal the duty ratio of which is about 50% is output from the signal generation unit 504. By continuously outputting such a bit pattern for each of pixels that are consecutive in the main scanning direction, the signal generation unit 504 is able to generate a drive signal.

The drive signal output from the signal generation unit 504 is input to the LD driving unit 203. The LD driving unit 203 supplies the driving current I to the LD 101a for a period according to the duty ratio. The LD 101*a* emits laser light for the period during which the driving current I is supplied.

Since the drive signal is generated in the above described manner, in the image forming apparatus of the present example embodiment, the LD 101*a* is subjected to ON/OFF control for each pixel even in a case where a solid image of maximum density is formed.

Figure 8:
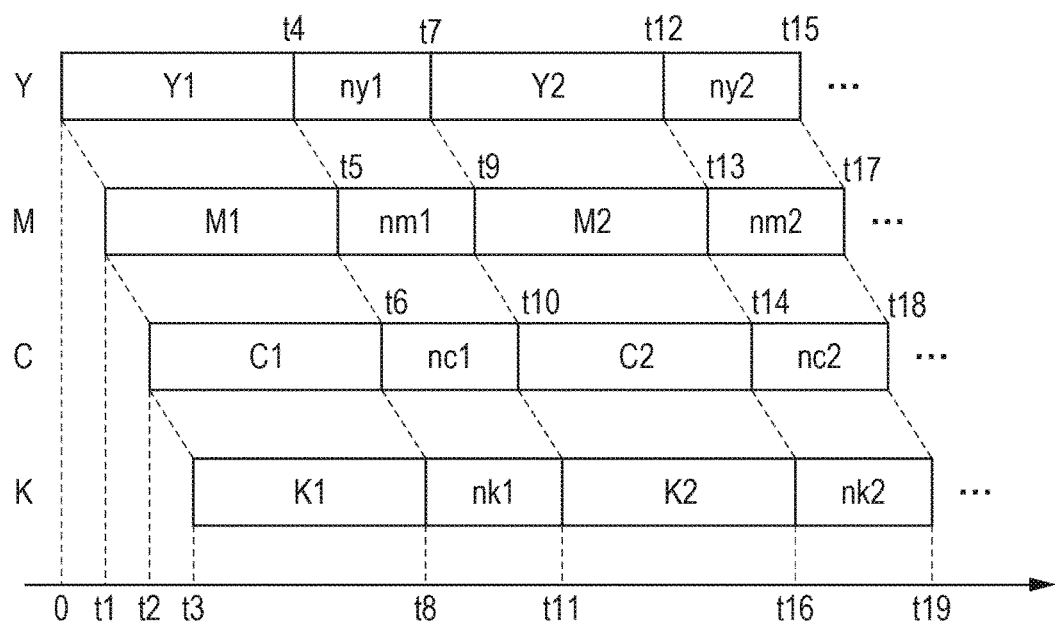
FIG. 8 is a timing chart illustrating an image formation timing of each color and an execution timing of discharging at a time when an image is formed on a plurality of sheets of A3-size recording materials.
Figure 10:
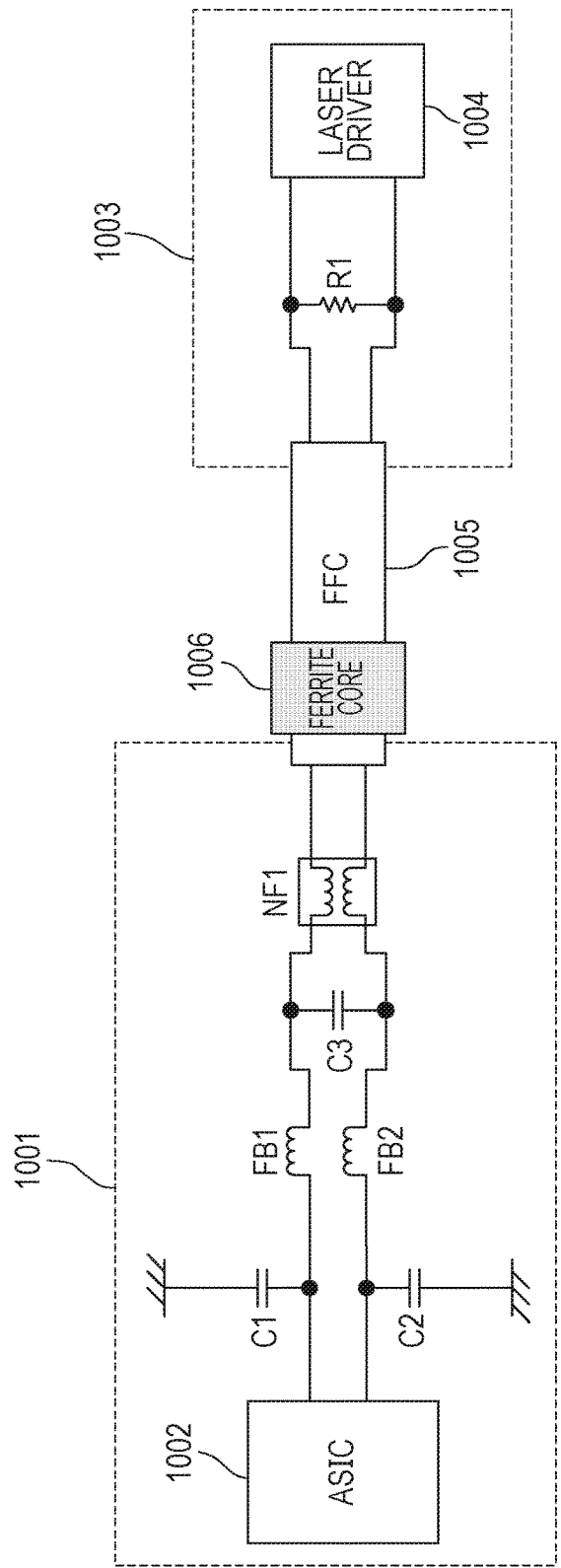
FIG. 10 is a view for explaining an example of a countermeasure against radiation noise.

FIG. 8 is a timing chart illustrating an image formation timing of each color and an execution timing of discharging at a time when an image is formed on a plurality of sheets of A3-size recording materials. It is assumed that a diameter of each of the photoconductive drums 11*a* to 11*d* of the respective colors is φ40 mm and arrangement is performed so that each pitch between the photoconductive drums is 80 mm. In this case, it is assumed that a tangential velocity of a surface of each of the photoconductive drums 11*a* to 11*d* of the respective colors and a surface velocity of the intermediate transfer belt 16 are V (mm/sec).

A period Y1 indicates a period during which an electrostatic latent image for forming a toner image of yellow is formed on a first recording material, and a period Y2 indicates a period during which an electrostatic latent image for forming a toner image of yellow is formed on a second recording material that comes immediately after the first one. A period ny1 indicates an execution period of a discharging process that is executed immediately after the period Y1, and a period ny2 indicates an execution period of a discharging process that is executed immediately after the period Y2. Since the similar is applied to M, C, and K, description thereof will be omitted.

As illustrated in FIG. 1, the photoconductive drums 11*a*, 11*b*, 11*c*, and 11*d* are arrayed in this order between the driving roller 25 and the driven roller 24 from an upstream side in a moving direction of the intermediate transfer belt 16. Therefore, formation of electrostatic latent images for one sheet of a recording material is started from yellow (0/t7/t15), and an image is formed by delaying start timings of the electrostatic latent images in order of magenta (t1/t9/t17), cyan (t2/t10/t18), and black (t3/t11/t19). Here, the start timing of formation of the electrostatic latent image of magenta is delayed for 80/V (sec) with respect to the start timing of formation of the electrostatic latent image of yellow. Similarly, the start timing of formation of the electrostatic latent image of cyan is delayed for 80/V (sec) with respect to the start timing of formation of the electrostatic latent image of magenta, and the start timing of formation of the electrostatic latent image of black is delayed for 80/V (sec) with respect to the start timing of formation of the electrostatic latent image of cyan. Note that, the start timing of the formation period of the electrostatic latent image of each of the colors is an end timing of a discharging process.

On the other hand, a formation period of the electrostatic latent image for one sheet of a recording material ends from yellow (t4/t12), and then those of magenta (t1/t9), cyan (t2/t10), and black (t3/t11) end in this order with delay. Here, an end timing of the formation period of the electrostatic latent image of magenta is delayed for 80/V (sec) with respect to an end timing of the formation period of the electrostatic latent image of yellow. Similarly, an end timing of the formation period of the electrostatic latent image of cyan is delayed for 80/V (sec) with respect to the end timing of the formation period of the electrostatic latent image of magenta, and an end timing of the formation period of the electrostatic latent image of black is delayed for 80/V (sec) with respect to the end timing of the formation period of the electrostatic latent image of cyan. Note that, the end timing of the formation period of each of the electrostatic latent images is a start timing of a discharging process of a corresponding one of the photoconductive drums 11*a* to 11*d*.

A length of an A3-size recording material in a longitudinal direction is 420 mm, so that a formation period of the electrostatic latent images of the colors in a case where an image is formed on the A3-size recording material is 420/V (sec). Moreover, since the image forming apparatus of the present example embodiment performs discharging by exposing the photoconductive drum 11 for two rounds thereof, a discharging period of each color is 251.3/V (sec).

When the image formation process and discharging are executed at the aforementioned timings, there is a period in which the photoconductive drums of at least two colors are discharged at the same time. In a case where exposure of the photoconductive drum 11 is performed with the drive signal A the duty ratio of which is 80% in such an image forming apparatus, a drive signal of a high frequency is generated at the same time, so that there is a possibility that intensity of radiation noise increases and exceeds a generation allowance value of radiation noise.

Against such a problem, the image forming apparatus of the present example embodiment has a configuration in which, at a time of causing the exposure unit 13 to execute exposure for discharging, the drive signal B the duty ratio of which is 100% is supplied to the exposure unit 13. Note that, the drive signal B indicating the duty ratio of which is 100% means a signal for each pixel in a period in which scanning is performed at least for an image formation region on the photoconductive drum 11, and the duty ratio of the drive signal B in a non-image region is not limited thereto.

That is, the CPU 120 outputs the switching signal to the CPU I/F unit 211 by serial communication in order to start discharging. The switching signal is input to the selector 214. The selector 214 switches setting by which an output of the drive signal A has been valid till then to setting by which an output of the drive signal B is made valid. Thereafter, the CPU 120 outputs the drive signal B the duty ratio of which is 100% to the CPU I/F unit 211 by serial communication. The drive signal B is output to the LD driving unit 203 via the selector 214. The LD driving unit 203 supplies the driving current I to the LD 101*a* in accordance with the drive signal B, and, in response thereto, the LD 101*a* emits laser light with which an image region of the photoconductive drum 11 is continuously scanned. After a discharging period ends, the CPU 120 outputs the switching signal to the CPU I/F unit 211 again to switch the setting of the selector 214 to a state in which the output of the drive signal A is made valid.

FIG. 9A illustrates a duty ratio of the drive signal A that is output by the video control unit 202 at a time of forming a solid image. FIG. 9B illustrates a duty ratio of the drive signal B that is output by the video control unit 202 at a time of performing discharging. At the time of forming a solid image as illustrated in FIG. 9A, an electrostatic latent image for obtaining solid density is formed, so that the video control unit 202 generates the drive signal A the duty ratio of which is 80%. On the other hand, in a case where discharging is performed, the video control unit 202 generates the drive signal B the duty ratio of which is 100%.

As above, in order to perform discharging for the plurality of photoconductive drums 11*a* to 11*d*, a duty ratio of a drive signal for each laser light source that exposes a corresponding one of the photoconductive drums 11*a* to 11*d* is set to be 100%, and it is thereby possible to suppress generation of radiation noise resulting from the drive signal and suppress an increase in costs due to a countermeasure against the radiation noise, such as addition of a noise filter or addition of a core, and an increase in a size of the image forming apparatus. Note that, although the image forming apparatus provided with the optical scanning device has been exemplified in the example embodiment, an embodiment may be an image forming apparatus that is provided, as a light source of exposure, with an exposure head such as an LED (Light Emitting Diode) or an organic EL (Organic Electro Luminescence) in place of the optical scanning device. In a case of the image forming apparatus provided with the exposure head, since a polygon mirror is not included, in order to perform discharging of a photoconductive drum, a drive signal a duty ratio of which is 100% is to be transmitted to a driving unit corresponding to the LD driving unit 203 from the video control unit 202 during an execution period of the discharging.

A drive signal a duty ratio of which is 100% is generated in order to discharge a photoconductive drum, and it is thereby possible to reduce radiation noise at a time of the discharging.

While the disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2017-169296 filed Sep. 4, 2017, which is hereby incorporated by reference herein in its entirety.

What is claimed is:

1. An image forming apparatus comprising:
a plurality of photoconductive drums;
a plurality of light emitting units each of which emits light with which a corresponding one of the photoconductive drums is exposed in a case where a driving current is supplied, the light emitting units being separately provided correspondingly to the plurality of photoconductive drums;
a transfer belt configured to be rotatably driven and onto which toner images formed on the plurality of photoconductive drums are transferred;
a driving unit that supplies the driving current to each of the light emitting units in accordance with a drive signal, the drive signal being an ON/OFF signal by which the light emitting units are turned on or off; and
a controller that transmits the drive signal to the driving unit, the controller selectively transmitting the drive signal generated on a basis of input image data for forming an electrostatic latent image on each of the photoconductive drums or the drive signal a duty ratio of which is 100% for performing discharging of the photoconductive drums,
wherein the plurality of photoconductive drums includes a first photoconductive drum, a second photoconductive drum, a third photoconductive drum, and a fourth photoconductive drum, and the first photoconductive drum, the second photoconductive drum, the third photoconductive drum, and the fourth conductive drum are arranged along a rotation direction of the transfer belt, and
wherein light emission of each of the light emitting units for discharging a corresponding one of the photoconductive drums is executed during a period that is equal to or more than one rotation cycle of the photoconductive drum.

2. The image forming apparatus according to claim 1,
wherein the plurality of photoconductive drums includes the first photoconductive drum, the second photoconductive drum, the third photoconductive drum, and the fourth photoconductive drum, and the photoconductive drums are arranged in a row, and
wherein the controller controls output timings of a plurality of drive signals that correspond to the plurality of light emitting units in accordance with arrangement of the plurality of photoconductive drums.

3. The image forming apparatus according to claim 2,
wherein the controller controls, in order that there is a period in which light emission of the plurality of light emitting units for discharging the photoconductive drums that are arranged so as to be adjacent to each other is performed at a same time, the output timings of the drive signals for performing the discharging.

4. The image forming apparatus according to claim 1,
wherein the input image data includes multi-valued data that indicates density of an image, and
wherein the controller includes an image processing unit that executes conversion processing that the input image data is converted into the drive signal, a signal generation unit that generates the drive signal the duty ratio of which is 100%, and a selector that selectively transmits, to the driving unit, the drive signal generated by the image processing unit or the drive signal generated by the signal generation unit.

5. The image forming apparatus according to claim 4,
wherein the controller converts the input image data into a drive signal by using a conversion table, and
wherein the conversion table is set so that a drive signal indicating a duty ratio according to density that is indicated by the input image data is generated, and is set so that a drive signal the duty ratio of which is not more than 100% is generated.

6. The image forming apparatus according to claim 1, further comprising:
rotating polygon mirrors which deflect light emitted by the light emitting units so that surfaces of the photoconductive drums are scanned with the light,
wherein the drive signal the duty ratio of which is 100% is supplied to the driving unit from the controller in a period in which at least an image formation region of the photoconductive drums are scanned.

7. The image forming apparatus according to claim 1,
wherein the driving unit is a driver IC that is separately provided for each of the plurality of light emitting units.

8. The image forming apparatus according to claim 1,
wherein the driving unit is a driver IC by which the plurality of light emitting units are driven.

9. An image forming apparatus, comprising:
a photoconductive drum;
a light emitting unit which emits light with which the photoconductive drum is exposed in a case where a driving current is supplied;
a driving unit that supplies the driving current to the light emitting unit in accordance with a drive signal, the drive signal being an ON/OFF signal by which the light emitting unit is turned on or off; and
a controller that transmits the drive signal to the driving unit, the controller selectively transmitting the drive signal generated on a basis of input image data for forming an electrostatic latent image on the photoconductive drum or the drive signal a duty ratio of which is 100% for performing discharging of the photoconductive drum, wherein light emission of the light emitting unit for discharging the photoconductive drum is executed during a period that is equal to or more than one rotation cycle of the photoconductive drum.

10. The image forming apparatus according to claim 9, wherein the input image data includes multi-valued data that indicates density of an image, and wherein the controller includes an image processing unit that executes conversion processing that the input image data is converted into the drive signal, a signal generation unit that generates the drive signal the duty ratio of which is 100%, and a selector that selectively transmits, to the driving unit, the drive signal generated by the image processing unit or the drive signal generated by the signal generation unit.

11. The image forming apparatus according to claim 10, wherein the controller converts the input image data into a drive signal by using a conversion table, and wherein the conversion table is set so that a drive signal indicating a duty ratio according to density that is indicated by the input image data is generated, and is set so that a drive signal the duty ratio of which is not more than 100% is generated.

12. The image forming apparatus according to claim 9, further comprising:

a rotating polygon mirror which deflects light emitted by the light emitting unit so that a surface of the photoconductive drum is scanned with the light, wherein the drive signal the duty ratio of which is 100% is supplied to the driving unit from the controller in a period in which at least an image formation region of the photoconductive drum is scanned.

* * * * *